June 27, 1967 L. B. JOHNSTON 3,328,086
ARTICLES OF COMPOSITE STRUCTURES OF FIBROUS GLASS
Original Filed Dec. 31, 1956 3 Sheets-Sheet 1
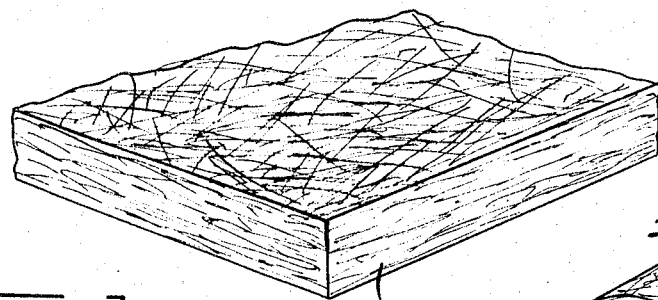
FIG-1-
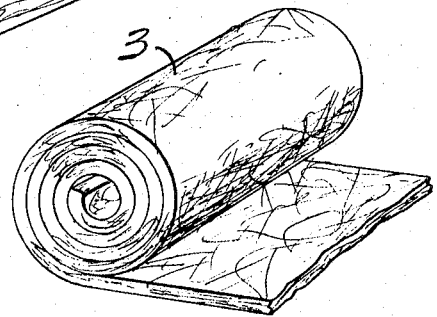
FIG-2-
INVENTOR:
LOWELL B. JOHNSTON.
BY
ATTORNEYS.

June 27, 1967 L. B. JOHNSTON 3,328,086
ARTICLES OF COMPOSITE STRUCTURES OF FIBROUS GLASS
Original Filed Dec. 31, 1956 3 Sheets-Sheet 2
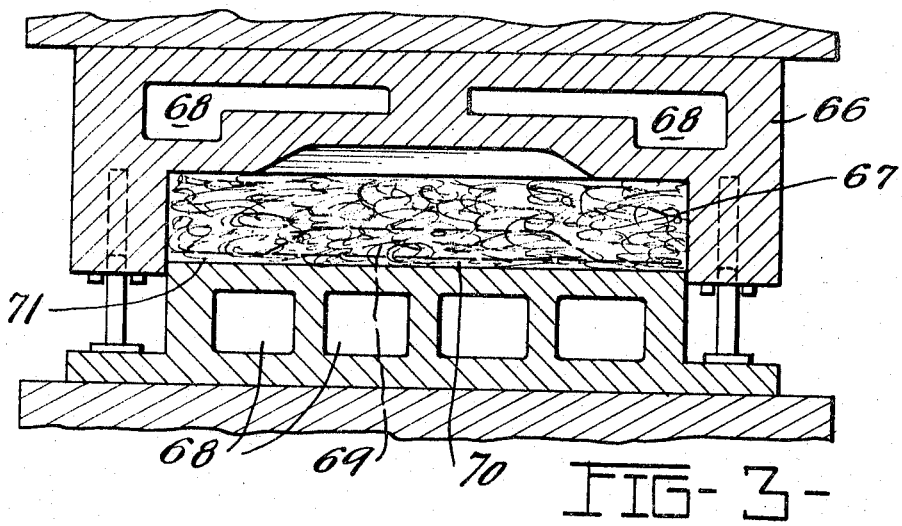
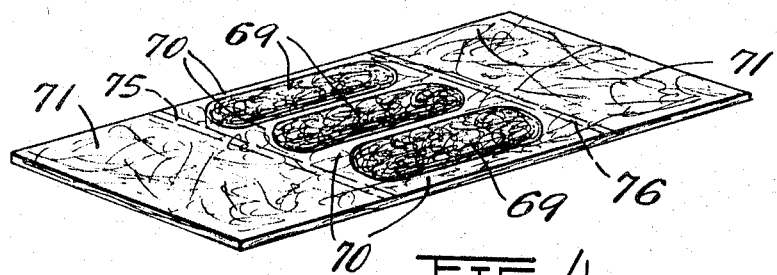
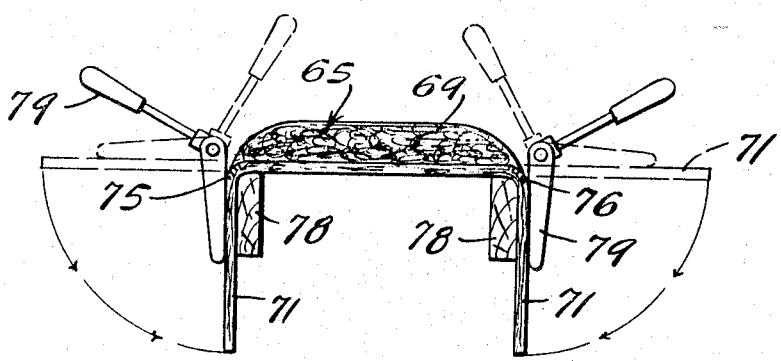
INVENTOR:
LOWELL B. JOHNSTON.
BY
ATTORNEY June 27, 1967 L. B. JOHNSTON 3,328,086
ARTICLES OF COMPOSITE STRUCTURES OF FIBROUS GLASS
Original Filed Dec. 31, 1956 3 Sheets-Sheet 3
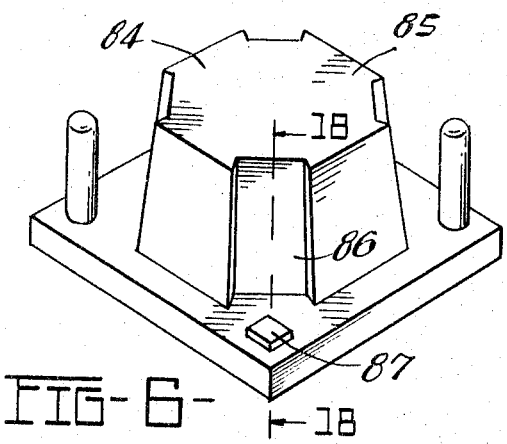
FIG-6-
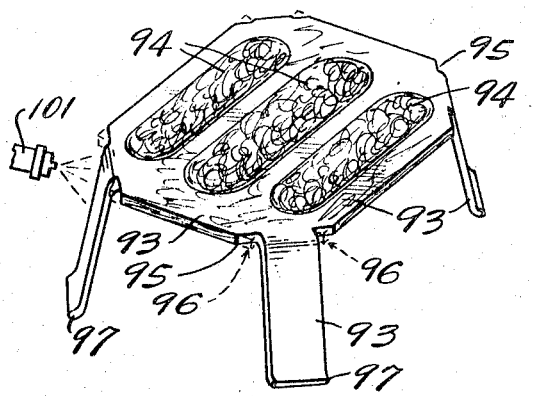
FIG-9-
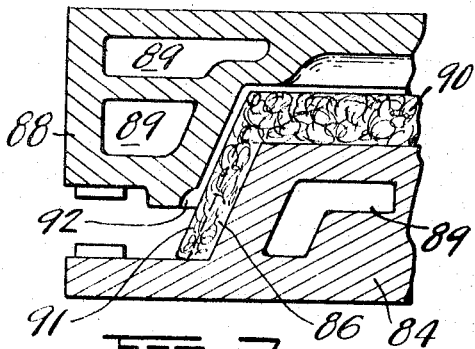
FIG-7-
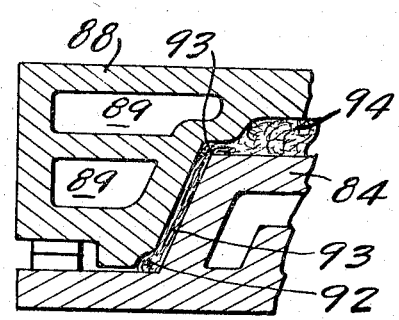
FIG-8-
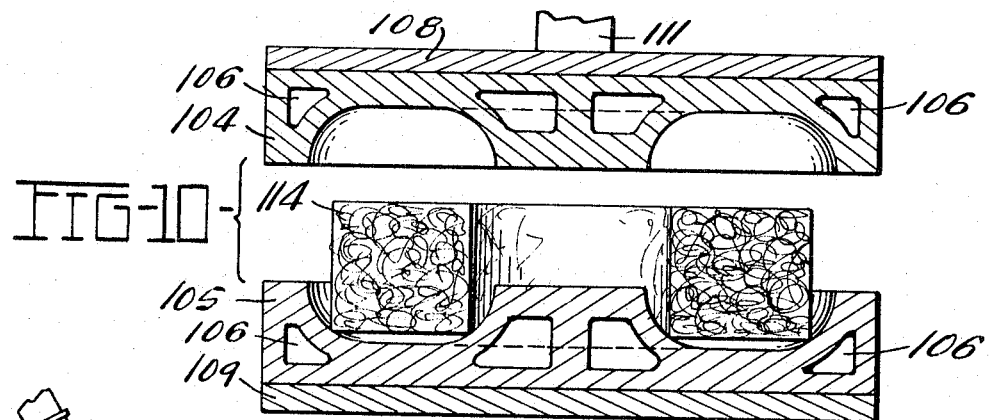
FIG-10-
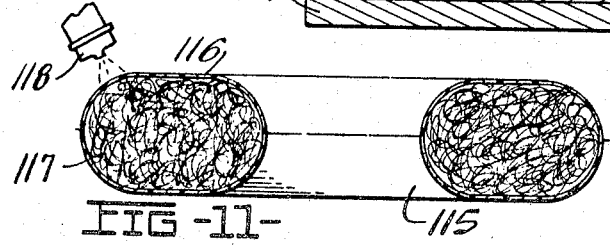
FIG-11-
INVENTOR:
LOWELL B. JOHNSTON.
BY
ATTORNEYS.

3,328,086
ARTICLES OF COMPOSITE STRUCTURES OF
FIBROUS GLASS
Lowell B. Johnston, Monrovia, Calif., assignor to
Owens-Corning Fiberglas Corporation, a corporation of Delaware
Application Mar. 21, 1963, Ser. No. 267,024, which is a division of application Ser. No. 631,830, Dec. 31, 1956. Divided and this application Aug. 20, 1965, Ser. No. 493,298
4 Claims. (Cl. 297—461)

This application is a division of application Ser. No. 267,024, filed in the name of the present inventor on Mar. 21, 1963, now abandoned, the latter application being a division of application Ser. No. 631,830, filed in the name of the present inventor on Dec. 31, 1956 and which issued Dec. 10, 1963 as U.S. Patent No. 3,113,788.

This invention relates primarily to articles composed of fibrous glass and a plastic, and to methods of producing such articles. More specifically the invention relates to such articles and methods in which the articles involved are composed of an integrated combination of two distinct fibrous glass and plastic structures in both of which fibrous glass provides dominant characteristics. The invention further relates to a unique air permeated, plastic bonded, fibrous glass structure of stress resisting capacity.

The qualities of glass which have made it an outstanding material for many centuries have been its transparency, luster, cheapness of ingredients, and its extraordinary durability. The latter characteristic is of great importance in the applications of glass in its comparatively new fibrous form. Besides this well known property of glass, glass fibers have proved to possess extreme strength and remarkable resilience.

Breaking strengths of freshly drawn glass fibers have been measured up to 900,000 p.s.i. The elasticity of glass fibers is unique in that they are perfectly elastic; the stress-strain relationship is a straight line to ultimate strength. These qualities are astonishing in their high degree, particularly in view of the common conception of glass as brittle and rigid.

Broadly considered, fibrous glass has been utilized in two major fields—as plastic bonded, pervious masses and as combined with plastic in closely compacted bodies. In both, advantage is taken of its attenuated form, while its chemical inertness is mainly of value in the first field and its high strength is of special significance in the second.

The original and probably the present principal use for fibrous glass is in comparatively loosely packed masses in which the fibers are closely associated in the manner of the cellulose fibers in cotton batting. A binding agent is ordinarily employed to aid in the coherence of the mass. The highest utility of this form, generally referred to as glass wool, has been in the absorption and resistance to movement of sound, heat and corporeal substances.

Its high competence in insulating or dispersing the travel of sound and heat is derived from the cellular or fine interstitial formation containing a great number of minute air pockets. This characteristic of its structure is also responsible for its effectiveness in filtering air and liquids. The inherent strength and resilience of the glass fibers are more fully relied upon in the use of bonded masses of glass wool in cushioning impact or weight stresses.

In this kind of fibrous glass product at least ninety-five percent of the mass usually consists of air space and the balance comprises glass fibers and the binder. The plastic binding material rarely exceeds twenty percent by weight of the two combined materials. This is approximately thirty three percent by volume due to the wide difference in specific gravities of the two substances. The latter figure relates to the comparative volumes of the glass fibers and the plastic binder and does not take into consideration the air content of the mass. The bonded fiber glass mass has a density of approximately seven pounds per cubic foot, derived from the weight of the glass fibers and plastic, when the proportion of air is ninety-five percent.

It is believed that, in general, products of bonded glass wool so far commercialized have not had a density greater than approximately twenty pounds per cubic foot, with air space accounting for about eighty-six percent of the total volume.

The second field in which fibrous glass has been most successfully exploited relates to generally rigid, solid bodies of glass fiber reinforced plastics. Here the strength of the fibrous glass has been the characteristic of the greatest value, as it is the factor that enables these products to bear tremendous loads. The plastic component provides shape and appearance and the dielectric property of the plastic is also of importance when such solid combinations of glass fibers and plastics are applied to electrical apparatus.

The proportion of glass fibers in reinforced plastics depends upon the strength desired in the particular product, but usually lies in the range of twenty to fifty percent, by volume. It is present in the highest degree in comparatively thin electrical insulating coverings composed of fibrous glass fabrics impregnated with plastic.

In fibrous glass reinforced plastic objects there is practically no incorporation of air in contrast to the minimum of eighty-six percent in commercial bodies of bonded glass wool; and the density of reinforced plastic ordinarily ranges between one hundred, and one hundred and ten pounds per cubic foot compared to the maximum of twenty pounds for products of bonded glass wool. While composed of the same two basic materials there is this great differentiation in their densities and the properties derived therefrom.

As set forth, there have been two spaced channels of great activity in producing articles composed of fiber glass and plastics.

On the one hand, there are the many varied products of fiber glass with a lesser content of plastic binder to hold the glass fibers in a unitary porous mass containing multiple minute pockets of air and possessing compressibility and pliancy.

On the other hand, there has been considerable production of generally rigid, sturdy articles composed of plastic material and glass fibers with the plastic material usually constituting the major component. These two fields have remained separate and distinct for more than a decade, a very long period in this fast moving industry.

Research people devoting their talents to the development of uses and products of glass fibers are highly respected for their advanced thinking and their disregard for traditional practices in venturing into new fields; surprisingly enough, they have so far overlooked the possibilities of entering or bridging the wide zone between these two types of glass fiber and plastic products. This broad, unexplored zone may be defined as including all air permeated, plastic bonded fibrous glass masses of densities anywhere between twenty and ninety pounds per cubic foot with an air content ranging up to eighty-six percent.

Applicant is, accordingly, deserving of very special recognition for apparently first crossing this sacrosanct barrier and discovering the impressive usefulness of the air permeated, bonded fibrous glass masses in the broad range so long ignored, and the remarkable utility of articles for the first time uniting the physical characteristics and attributes of the two previously diverse product categories.

The principle object of this invention is accordingly to provide fibrous glass and plastic articles of the described dual nature and methods of producing such articles.

More specifically, it is the object of the invention to provide panels of thermal and sound insulating masses of bonded glass fiber with integral supporting frames, or hangers; impact or weight receiving cushions of glass fiber with integral supporting ribs, frames, or legs; and flotation devices with integrated reinforced portions.

A further object of this invention is to provide a glass fiber and plastic structure of basically cellular or pervious character but having a density affording strength to the structure for exceeding that of previously created masses of plastic bonded glass wool.

An additional object of the invention is to provide fabricating methods for producing articles of the above description.

The purposes of this invention are attained in a preferred manner by high densification by compression of selected sections only of masses of glass fibers containing a plastic bonding agent, and curing the bonding agent while the portions of the mass are held in such densified condition.

Additional methods of securing the objects of the invention, as well as other advantages and benefits thereof, may be better understood from the following description and by referring to the drawings, in which:

FIGURE 1 is a perspective view of a broken section of a batt of glass fibers as cut in rectangular block form from the continuous pack or web carried by a conveyor from the glass wool forming station;

FIGURE 2 is a perspective view of a rolled blanket of glass wool;

FIGURE 3 is a vertical section of a mold designed for forming a cushioned stool blank;

FIGURE 4 is a perspective view of the product of the mold of FIGURE 3;

FIGURE 5 shows an elevation of the cushioned stool shaped from the blank of FIGURE 4;

FIGURE 6 is a perspective view of the lower or male part of a mold for forming, in one operation, a four-legged stool;

FIGURE 7 is a broken section taken on the line 18—18 of FIGURE 6 showing the plastic impregnated fibrous glass stock in place upon the lower part of the mold and a portion of the upper or female mold in raised position;

FIGURE 8 is a section similar to that of FIGURE 18 with the mold sections in closed relation;

FIGURE 9 is a perspective illustration of the stool produced by the mold of the preceding figures;

FIGURE 10 is a vertical section of a mold for creating a flotation device such as a life preserver with a blank of glass wool, impregnated with a plastic binder, in position to be formed; and FIGURE 11 is a vertical section of the article produced by the mold illustrated in FIGURE 10.

The glass fibers involved in the products and methods of this invention are more commonly of a diameter between fifteen and twenty, hundred thousandths of an inch but may have diameters in the range between three and one hundred, hundred thousandths. Such fine fibers are produced by well established, very concise, ingenious processes utilizing high pressure steam jets or high velocity, superheated gases to attenuate streams of molten glass. As these fibers, in various lengths, but seldom surpassing several inches, drop away from the forming station they are coated with a binding material discharged from adjacently positioned spray devices.

The fibers fall upon a conveyor and accumulate thereon to a depth usually in the range of two to eight inches, according to the thickness desired, and as controlled by the speed of the conveyor and the production rate of the fibers. The continuous blanket or pack of glass fibers travels with the conveyor and ordinarily passes through a baking oven for setting of the binding agent, which preferably is a phenol formaldehyde resin. However, for purposes of this invention the binder is not set or cured at this stage.

Depending upon the ultimate use for which it is intended the packed web of glass fibers is cut at the discharge end of the conveyor into block sections 2, such as illustrated in FIGURE 1, or divided into broad strips 3 and rolled as depicted in FIGURE 2.

Either the block or rolled glass wool stock is adaptable to this invention, although the former would be more suitable where it could be cut to size or where it would have a thickness not feasible for rolled batting stock.

In connection with the bonded glass articles described in explaining how this invention may be practiced, a phenol formaldehyde thermosetting plastic resin would function very satsifactorily as a binding agent. It is a standard glass fiber binding material and its qualities and manner of use are well understood. However, once cured, it takes a permanent set and an object in which it is incorporated cannot readily be reshaped. For this reason there may be occasions when the employment of a thermoplastic binding material would be more advantageous in executing this invention.

An article and method of fabrication for which a thermoplastic resin would be suitable are presented in FIGURES 3, 4 and 5. A polystyrene plastic would presently be recommended for the purpose because of its very good, general characteristics, and since its behavior in association with glass fibers is comparatively well understood. It may be sprayed as a water emulsion upon the glass fibers as they fall from their forming station.

The article taken for illustration is a cushioned stool 65 having panelled leg members 71. Since the densification and strength of the closely packed glass fibers require substantial compression in the preferred manner of practicing this invention, a simpler mold may be utilized if the compression forces may be applied in one direction only against stock lying generally in a single plane. This would not be adaptable to producing an article having portions extending in various planes at extreme angles to each other. However, the benefits of a simple mold are available for producing objects with angled members with the use of a thermoplastic resin whereby the final shape may be obtained by reheating and further forming the densified product of the molding operation.

As shown in FIGURE 3, the mold 66 is designed to receive a rectangular blank of glass wool 67 impregnated, for example, with twenty-five percent by weight, of a polystyrene resin. The batt 67, comprising the blank, is eight inches thick and has a density of four pounds per cubic foot. Before it may be formed in the mold, the glass fiber batt must be raised to a temperature causing the polystyrene to reach a state of plasticity. This may be done through preheating or by passing steam through cored passages 68 in the mold.

With the polystyrene in its proper fluid condition the mold is closed upon the rectangular glass fiber blank 67. The mold is designed to compress the portions intended for cushion areas 69 to a thickness of two inches and a density of sixteen pounds per cubic foot; and to condense the narrow sections 70 along the sides of the cushion portions and the ends 71, ultimately serving as vertical supporting panels, to a thickness of one-half inch and a density of sixty-four pounds. The mold is then cooled to solidify the plastic, preparatory to opening of the mold and removal of the formed blank.

A plan view of the semi-formed stool is depicted in FIGURE 4. The solidified rudimentary leg areas 71 are coplanar with the supporting grid framing 70 which surrounds the cushioning masses 69.

By reheating linear areas indicated at 75 and 76 the polystyrene is softened and the legs may be turned downward oven stationary dies 78 into their functioning vertical position through bending tools 79, as portrayed in FIGURE 5.

In FIGURES 6, 7, 8 and 9 is illustrated a cushioned stool and method of forming it in one molding operation. The male mold part 84 with guide pins and stops 87 is shown in FIGURE 6. It has a truncated pyramidal shape the flat top 85 of which receives the glass fiber stock impregnated with uncured phenol formaldehyde resin intended to form the partially cushioned seating surface of the stool. The sloping corner grooves 86 in which the legs are formed receive more heavily resin-impregnated fibrous glass.

A vertical section, taken on the diagonal line 18—18 of FIGURE 6, through a corner portion of the male mold part 84 and the corresponding portion of the female mold 88, in raised position, is shown in FIGURE 7. Steam chambers are indicated at 89. The glass fiber stock 90 for the cushioned area is laid in place over the top of the male mold and the more heavily resin impregnated portion 91 of the glass wool is packed into the corner grooves 86. While wet with the uncured resin, the glass wool will remain momentarily in hand-pressed condensed condition. This permits it to be inserted in the groove more snugly and out of the way of the edges of the female mold when it is brought down to closed position. The glass stock is then less likely to be squeezed out as undesirable flash or impede closing of the mold.

In FIGURE 8 the mold is illustrated in closed position. The glass fiber stock in the leg areas 93 has been compressed to one-tenth of its original thickness as has the glass fiber mass disposed in strips 93 over the top of the male mold and intended as a grid shaped support for the cushioned areas 94. The latter are compressed to about one half of their original thickness. As a consequence the cushioning bonded fiber mass 94 has a density of fourteen pounds per cubic foot, and the legs 93 and strengthened grid frame 93 have a density of seventy pounds per cubic foot. To provide the highly densified portions with a smoother appearance and to increase their solidarity, additional resin should be applied by a squeegee, or, the spray nozzle 101 indicated in FIGURE 9. In either case it should be forced into any open interstices of the surface. This additional resin may be self curing if of the type carrying a catalytic agent.

To relieve any tendency of the glass wool in the legs to be drawn downwardly by the closing movement of the molds the female mold has a cut away portion 92 into which glass fiber stock is received to form a small foot 97 at the base of the leg. Due to the nature of the molding operation, projecting corners 96 are present at the sides of the top of each leg. These may be cut off to give a smoother appearance as indicated at 95.

In FIGURES 10 and 11 a manner of utilizing the principles of the invention in creating an article with a protective shell is illustrated. The object used as an example is a life preservor. The interior of such a flotation article should of course be composed of a most buoyant substance, while the exterior should be strong enough to hold the shape of the article and resist blows to which it may be subjected.

In FIGURE 10 is shown the shaping mold with a square cornered ring of resin impregnated, glass wool 114, preferably of a density between one and two pounds, in place between the upper and lower halves, 104 and 105, of the mold. Steam cores are indicated at 106 and platens at 108 and 109. Closing of the mold by ram 111 brings the glass wool blank 114 into the conventional rounded life preserver shape 115 shown in FIGURE 11. Then a heavy coating of additional resin is applied over the surface of the life preserver by use of the spray device 118. This resin is then forced into the outer interstices of the bonded glass fibers with a squeegee. This coating 116 is subsequently hardened in a curing treatment and provides the fluffily packed interior 117 with a sturdy protective shell.

Reference herein has been restricted to phenol formaldehyde and polystyrene plastics as they are considered best known, as representative of thermosetting and thermoplastic resins, by technicians in the fibrous glass industry. Other plastic resins are quite adaptable to this invention and may have advantages under certain conditions. For instance, the thermosetting epoxy resins would be superior to phenol formaldehyde under curing of heavy sections as they do not release gases and extraneous matter. Other examples could involve the better electrical properties of polyesters, and melamines. Therefore it is not desired to limit the scope of this invention to any particular plastic component.

While the disclosure has presented articles with various shapes of densified strengthened sections, there are many alternate forms which would lend themselves to the practice of this invention and would come within its scope.

Likewise certain specific densities have been cited in describing the embodiments disclosed herein. It should be realized that the densities involved are somewhat relative in that a fluffy stock of bonded glass fibers may be held for light duty by a strengthened section of quite low density, while an article for liquid filtering or impact cushioning would require an integrated supporting section of considerable densification and sturdiness.

In conclusion it may be well to summarize the salient points of novelty believed to reside in the subject matter of this application.

The board inventive themes are carried into the stools presented in FIGURES 5 and 9. The first is generally similar, in having portions of contrasting densities, to preceding articles with the substitution of a thermoplastic resin for the more standard phenol formaldehyde.

The stool of FIGURE 9 is an article not easily formed with straight compression so utilization is made of extra loading of plastics in portions to be relied upon for support. It also has a toughened outer layer obtained by the application of additional resin after the forming operation.

The flotation device of FIGURE 11 is illustrative of an article embodying this invention in which the strengthened area constitutes a shell for a lightly packed inner mass.

The fundamental method of producing articles devised by applicant is the compression of certain areas of a mass of fiber glass carrying an uncured resin binder to bring about, upon curing of the resin, a much greater densification in the certain areas as compared with that of the balance of the mass.

A closely allied method is that utilized in producing the new, air permeated, strength providing structures, wherein a mass of resin impregnated glass fibers is compressed to a point where the resin bridges between substantial portions of the lengths of the fibers, with entrained air pockets of reduced quantity and size, and the resin is cured while the mass is so compressed.

Collateral methods relate to the producing of an article having a comparatively loose core and a sturdy outer shell, the utilization of a thermoplastic, and lesser steps taken in the creation of the various embodiments.

As may be concluded from the preceding, applicant has accomplished the objects of his invention through the creation of new structures of air permeated, plastic bonded glass fibers; providing articles of plastic and fibrous glass of multiple densities and function; and through the provision of methods for producing such structures and articles.

I claim:

1. A composite, integrated, non-planar, movable, independently serviceable article of fibrous glass and a resinous material having distinct sections of different structural and utility characteristics, said sections including a section of low density, with a preponderant air content, in which the fibrous glass is generally held in spaced relation by a binder of resinous material, and a sturdy, semi-solid section of high density with a substantially continuous and volumetrically preponderant component of resinous material, which is reinforced with fibrous glass.

2. An independent, movable structure having an air permeated, resilient, low density first portion of resin bonded, discontinuous and randomly positioned glass fibers, said first portion being generally homogeneous in relative content of resin and glass fibers, and a rigid, smooth-surfaced, substantially impervious second portion integral with said first portion, said second portion being principally of a resinous composition reinforced by glass fibers extending therein from said first portion.

3. A composite article according to claim 1 in which the section of low density is compressible and resilient.

4. A structure according to claim 2 in which the surface layer of said second portion is generally free of glass fibers.

References Cited
UNITED STATES PATENTS

| | | | |
|---|---|---|---|
| 2,244,912 | 6/1941 | Kollander | 297—461 X |
| 3,113,788 | 12/1963 | Johnston | 280—150 |
| 3,150,032 | 9/1964 | Rubenstein | 161—161 |
| 3,164,110 | 1/1965 | Bofinger | 108—161 |

CASMIR A. NUMBERG, *Primary Examiner.*